(12) United States Patent
Moy

(10) Patent No.: US 7,480,712 B2
(45) Date of Patent: Jan. 20, 2009

(54) COMPUTER AUTOMATED GROUP DETECTION

(75) Inventor: Melanie Tina Moy, Austin, TX (US)

(73) Assignee: 21st Century Technologies, Inc., Austin, TX (US)

(\*) Notice: Subject to any disclaimer, the term of this patent is extended or adjusted under 35 U.S.C. 154(b) by 172 days.

(21) Appl. No.: 11/539,436

(22) Filed: Oct. 6, 2006

(65) Prior Publication Data

US 2008/0086551 A1  Apr. 10, 2008

Related U.S. Application Data

(60) Provisional application No. 60/784,426, filed on Mar. 21, 2006.

(51) Int. Cl.
*G06F 15/16* (2006.01)
*G06F 15/173* (2006.01)
*G06F 15/177* (2006.01)

(52) U.S. Cl. ............... 709/223; 709/220; 709/222; 709/224; 709/227

(58) Field of Classification Search ........... 707/200; 709/224, 220, 222, 223, 227; 713/200; 717/125
See application file for complete search history.

(56) References Cited

U.S. PATENT DOCUMENTS

| | | | |
|---|---|---|---|
| 2003/0097588 A1* | 5/2003 | Fischman et al. | 713/200 |
| 2004/0205726 A1* | 10/2004 | Chedgey et al. | 717/125 |
| 2006/0037075 A1* | 2/2006 | Frattura et al. | 709/224 |
| 2006/0112146 A1* | 5/2006 | Song et al. | 707/200 |

FOREIGN PATENT DOCUMENTS

EP   1335557 A1 * 8/2003

\* cited by examiner

*Primary Examiner*—Quang N. Nguyen
(74) *Attorney, Agent, or Firm*—Dillon & Yudell LLP

(57) ABSTRACT

A method, system and computer program product implementing a computational algorithm that enables analysts to discover/find groups within a database of seemingly random electronic data in a relatively short period of time. A computer system is provided that includes a processor and program code executing on the processor for completing the following functions: (a) receiving a plurality of random electronic data corresponding to one or more activity within a monitored system; (b) discovering a group of associated data points from within the plurality of electronic data.

31 Claims, 10 Drawing Sheets

COMPUTER AUTOMATED GROUP DETECTION

PRIORITY CLAIM

Benefit of priority under 35 U.S.C. §119(e) is claimed based on U.S. Provisional Application No. 60/784,426, entitled, "Computer Automated Group Detection," filed on Mar. 21, 2006 which disclosure is incorporated herein by reference.

RELATED APPLICATIONS

The present invention is related to the subject matter of the following commonly assigned, co-pending patent applications, whose content are incorporated herein where relevant:

(1) Ser. No. 11/367,944 title "Enabling Network Intrusion Detection by Representing Network Activity;" and (2) Ser. No. 11/367,943 title "Intelligent Intrusion Detection System Utilizing Enhanced Graph-Matching."

GOVERNMENT RIGHTS

This invention was made with Government support under Agreement No. MDA972-03-9-0001 awarded by DARPA. The U.S. Government has certain rights to this invention.

BACKGROUND OF THE INVENTION

1. Field of the Invention

The illustrative embodiment of the present invention relates generally to group detection and more particularly to computer-implemented group detection.

2. Description of the Related Art

Group Detection (GD) is the act of finding clusters of associated entities given information about the connections between those entities. GD algorithms may be utilized to: (1) find groups; (2) create implicit links between individuals who are not explicitly linked; (3) identify couriers between groups; and (4) identify aliases or possible database errors. Group detection algorithms have a variety of applications in diverse industries and are not limited to the uses described in 1-4.

Group detection may be applied to a variety of domains. For example, GD may be utilized to identify team-membership given a dataset assembled from email traffic at a company. One might expect to see many emails exchanged between team members, and fewer emails exchanged between individuals who are on different teams. The high occurrence of emails between certain individuals implies team membership. Other applications include, for example: (1) finding cliques or social-groups given information about the communication habits of individuals; (2) finding related documents given information about document citation; and (3) finding athletic conferences given a teams' playoff schedule.

Manually looking for groups in a large dataset is nearly impossible. FIG. 3 shows a graph with 323 nodes and 4579 edges, which represents a simple dataset. With this relatively small dataset, the groups are very difficult to spot/identify with conventional methods, which are performed manually. Thus, a small number of group detection algorithms have been created/proposed. These few group detection algorithms that currently exist are based on probabilistic generative models. Probabilistic generative models assume that some parameterized random process generated the data, and these models try to learn the parameter values that best explain the data. With these models, analysts provide information such as the probability of a random link occurring between any two entities, and the models utilize this manually provided information to account for noise in the data. However, these algorithms are difficult to utilize when little to no information is known about the structure of the dataset. Furthermore, trial runs have shown that these algorithms perform poorly on datasets that lack noise.

SUMMARY OF THE INVENTION

Disclosed is a method, system and computer program product implementing a computational algorithm that enables analysts to discover/find groups within a database of seemingly random electronic data in a relatively short period of time. A computer system is provided that includes a processor and program code executing on the processor for completing the following functions: (a) receiving a plurality of random electronic data corresponding to one or more activity within a monitored system; (b) discovering a group of associated data points from within the plurality of electronic data.

Two primary embodiments are provided for completing the discovering process, and each embodiment is implemented via a different algorithm within a Group Detection utility. These embodiments are the Best Friends (BF) embodiment and the Automated Best Friends (AutoBF) embodiment. Each embodiment is provided by an associated utility/algorithm, referred to herein as the BF utility/algorithm and the AutoBF utility/algorithm, which respectively comprise program code for completing the specific group detection and group linking algorithms. The BF algorithm finds groups based on an input graph and a set of analyst-defined parameters. The BF algorithm is primarily utilized when the analyst understands the general structure of the would-be groups. Thus, the AutoBF algorithm requires only an input graph to find groups. This algorithm is primarily utilized when the analyst has little to no information about the general structure of the groups. The AutoBF is similar to the BF algorithm, except that the AutoBF algorithm does not require a set of analyst-defined parameters. Instead, AutoBF uses local neighborhood structure to determine the veracity of a group.

All objects, features, and advantages of the present invention will become apparent in the following detailed written description.

BRIEF DESCRIPTION OF THE DRAWINGS

This invention is described in an illustrated embodiment in the following description with reference to the drawings, in which like numbers represent the same or similar elements, as follows.

DETAILED DESCRIPTION OF PREFERRED EMBODIMENTS

The present invention provides a method, system and computer program product implementing a computational algorithm that enables analysts to discover/find groups within a database of seemingly random electronic data in a relatively short period of time. A computer system is provided that includes a processor and program code executing on the processor for completing the following functions: (a) receiving a plurality of random electronic data corresponding to one or more activity within a monitored system; (b) discovering a group of associated data points from within the plurality of electronic data.

Two primary embodiments are provided for completing the discovering process, and each embodiment is implemented via a different Group Detection utility (or algorithm). These embodiments are the Best Friends (BF) embodiment and the Automated Best Friends (AutoBF) embodiment. Each embodiment is provided by an associated utility (or algorithm), referred to herein as the BF utility and the AutoBF utility, which respectively comprise program code for the specific group detection and group linking algorithms. In the described embodiment, both algorithms are designed around the concept referred to as a "Simple Group Rule", which states that if a node has a set of neighbors, a subgroup of those neighbors is able to form a group if the nodes in the subgroup are connected to most of the other nodes in the subgroup. As an example, if A is a neighbor of B & C, and B & C are neighbors of each other, then A, B, & C form a group.

The description of the invention is presented with multiple sections and subsections, delineated by corresponding headings and subheadings. The headings and subheadings are intended to improve the flow and structure of the description, but not imply any limitations on the invention. The content (i.e., features described) within any one section may be extended into other sections. Further, functional features provided within specific sections may be practiced individually or in combination with other features provided within other sections. That is, the specific implementations of group detection (GD) may utilize only some of the functional features among multiple features described in particular sections and/or may include only features described in some (but not all) of the sections. For example, GD may be implemented with either one or both of the best friends algorithm and automated best friends algorithm as further described below.

More specifically, current Section A introduces the concept of group detection and provides a structural layout for the network and hardware/software components of the data processing system provided therein. Sections B and C respectively describe the software-implemented components of the BF utility and AutoBF utility. Finally, Section D provides several examples of the implementation of group detection utilizing BF and AutoBF algorithms on specific data sets.

A. Hardware and Software Components

Figure 1A:
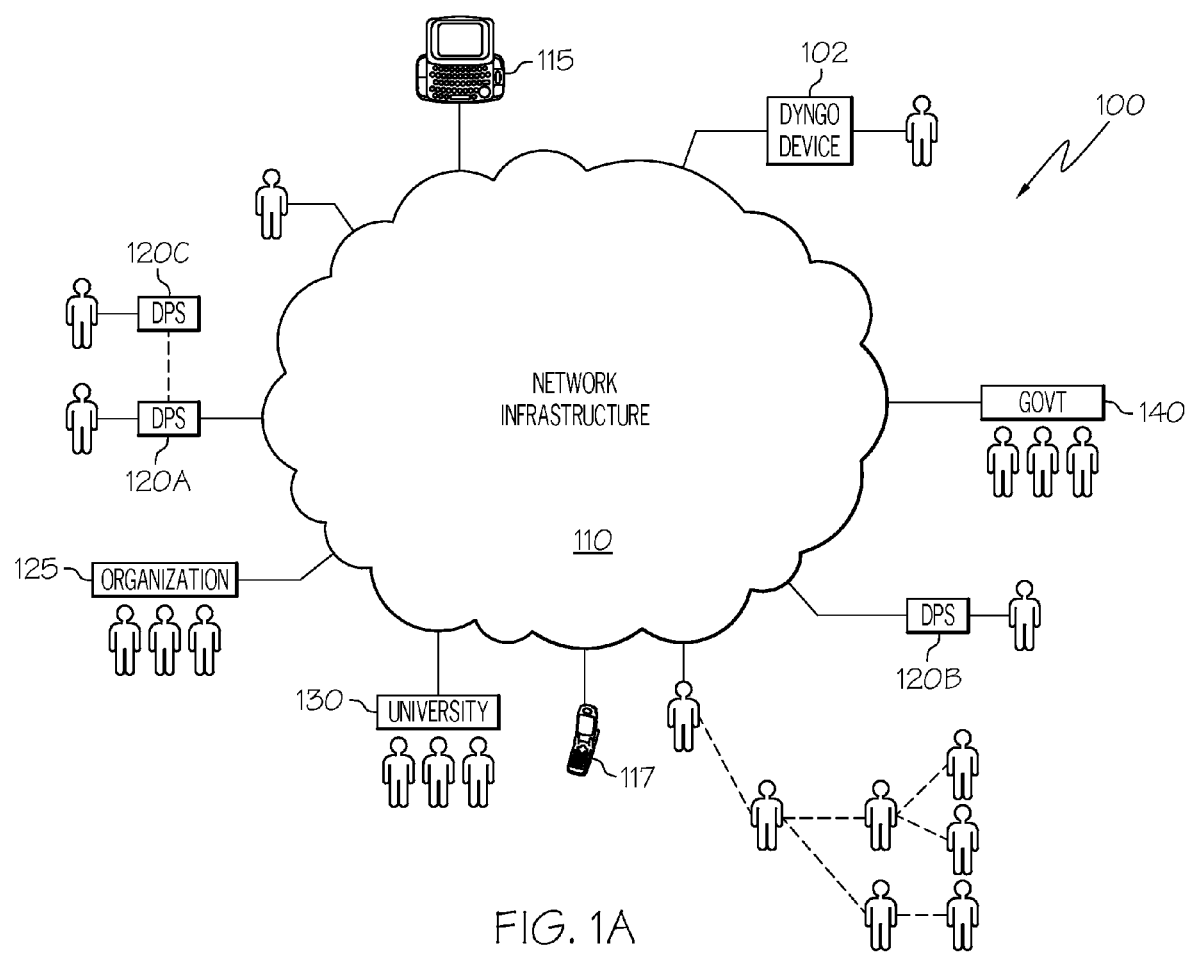
FIG. 1 illustrates an example layout of a multi-faceted communication network, which generates inter-connectivity and inter-communication data within which the group detection (GD) via Best Friends (BF) and Automated Best Friends (AutoBF) algorithms may advantageously be implemented, according to one embodiment of the invention.
Figure 1B:
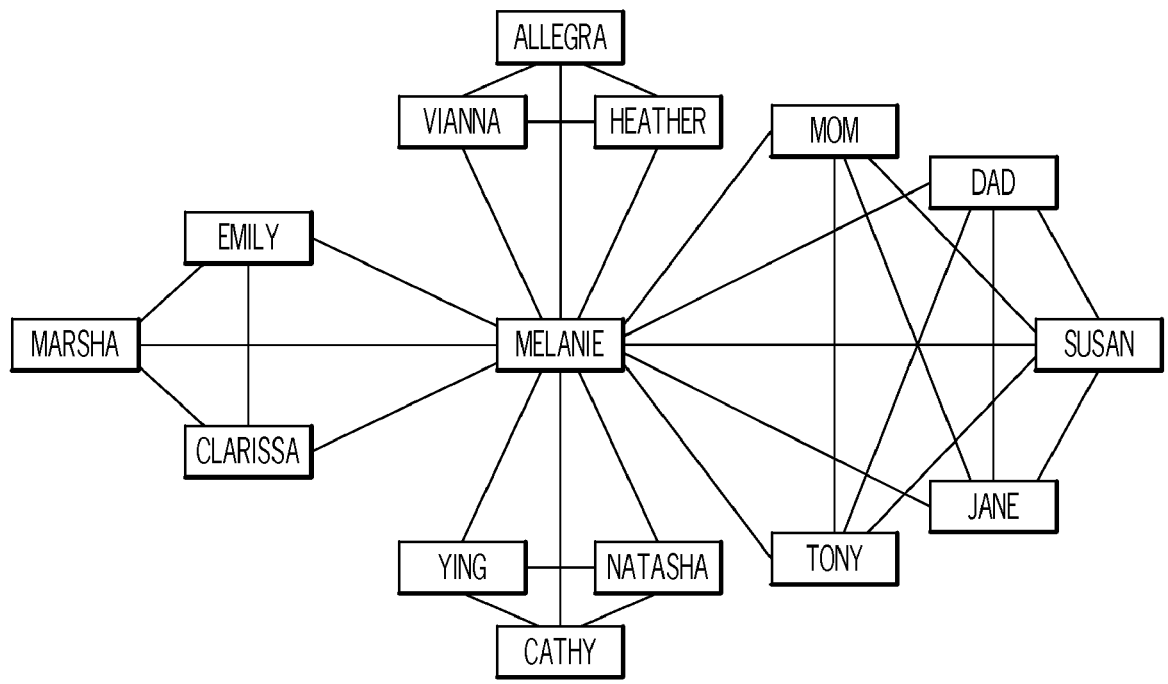
Figure 2:
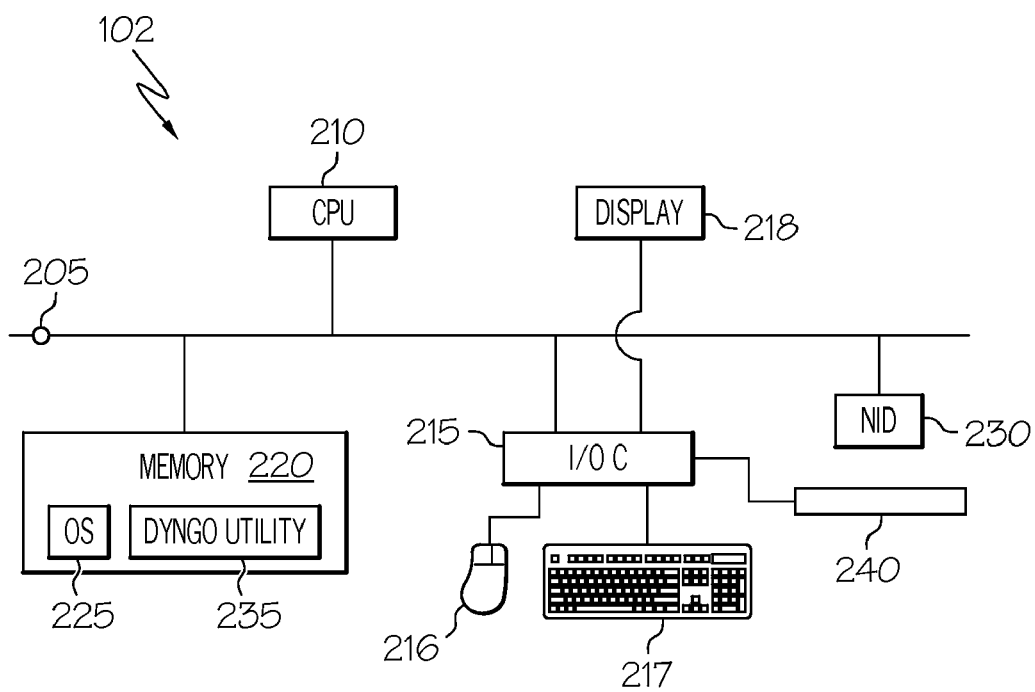
FIG. 2 is a block diagram representation of an example computer system, which may be utilized as a GD device according to one embodiment of the invention.

With reference now to the figures and in particular to FIGS. 1 and 2, there are illustrated an example network and data processing system within which the group detection features and functionality may be implemented, in accordance with one embodiment of the invention. Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Returning to FIG. 1, there is depicted a pictorial representation of a communication network comprising a data processing system (DPS) network and person-to-person network (collectively referred to as communication network 100), in which the present invention may be implemented. The DPS network within communication network system 100 comprises network backbone/infrastructure 110, which is the medium utilized to provide communication links between various devices (e.g., cell phones 117, PDAs 115) and computers (120A/B) interconnected via a complex fabric that makes up network backbone 110. Network backbone 110 may include routers and gateways and other communication/routing mechanisms, and may provide connections via wire, wireless communication links, or fiber optic cables.

As illustrated, each device connected within communication network 100 has associated therewith a person who sets up, operates, or monitors the device to enable the communication across the network backbone 110 via that specific device. In addition to the hardware-enabled communication methods provided by these devices, however, communication network 100 comprises a collection of individuals and/or groups or organizations (e.g., orgs 125, schools 130, and government 140) that also contribute to the communication/interactions within communication network 100.

Figure 3:
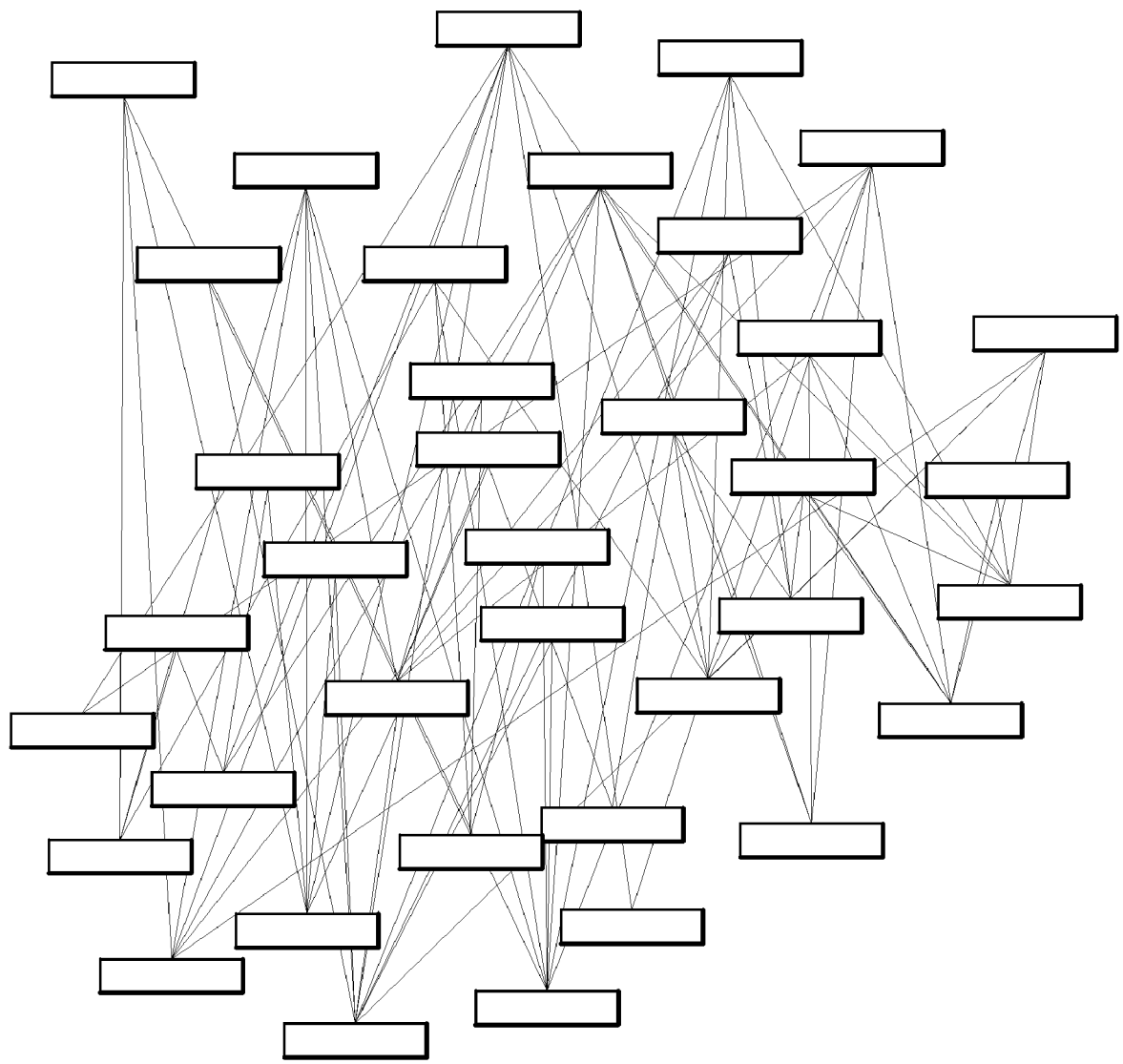
FIG. 3 illustrates an example dataset comprising a relatively large number of data components.

Within the description of the present invention, references are made to "friends" and "best friends" and relationships and/or interactions/communications shared between persons within a data set, who may be grouped given certain criteria. It is understood that in the context of the invention, these terms refer to not only individuals (persons) and direct personal communication between these individuals but can also refer to (but are not limited to): (a) communications between computers and other devices that may or may not be directly linked to an individual; (b) relationships that exist amongst non-human entities, such as businesses, schools, corporations, government, and the like; (c) other relational connections, events, occurrences, people, and organizations. Within this environment, a single entity/person may have connections (directly and indirectly) to multiple other entities/persons within the communication network, which results in a very complex series of points/nodes when represented on an activity graph. Thus, the communication network described within the invention may also be represented as a simple person-to-person communication network, as shown by FIG. 1B or a complex collection of interconnected data points within a graph, as shown by FIG. 3.

In addition to the above complex connection of devices, individuals, and entities/organizations, communication system 100 comprises a group detection and/or monitoring device, referred to hereinafter as group detection (GD) device 102, which comprises several hardware and software components that enable GD functionality, based on received data/information from communication network and/or analyst inputs.

FIG. 1 and the other figures described below are provided as examples within the illustrative embodiment(s), and are not to be construed as providing any architectural, structural or functional limitation on the present invention. The figures and descriptions accompanying them are to be given their broadest reading including any possible equivalents thereof.

Communication system 100 may include additional servers, clients, and other devices not shown. The exact complexity of network devices may range from a simple two device network to a network comprising thousands or more interconnected devices. The computer network of communication system 100 maybe an intranet or a local area network (LAN). In more complex implementations, communication system 100 may be a wide area network (WAN), such as the Internet and the network infrastructure may be represented as a global collection of smaller networks and gateways that utilize the Transmission Control Protocol/Internet Protocol (TCP/IP) suite of protocols to communicate with each other.

Referring now to FIG. 2, there is depicted a block diagram representation of a data processing system that may be utilized as GD device 102 (as well as one of the remote network-connected devices/computer systems) in FIG. 1, in accordance with an illustrative embodiment of the present invention. The GD device 102 may be a symmetric multiprocessor (SMP) system including one or more central processing units (CPU) 210 connected to memory 220 via system interconnect/bus 205. Also connected to system bus 205 is I/O controller 215, which provides connectivity and control for input devices, mouse 216 and keyboard 217, and output device, display 218. Additionally, a multimedia drive 240 (e.g., CDRW or DVD drive) is coupled to I/O controller and operates as both an input and an output device.

GD device 102 is also illustrated with a network interface device (NID) 230 with which GD device 102 connects to another computer device or computer network (FIG. 1). NID 230 may be a modem and/or network adapter, for example, depending on the type of network and connection to the network. It is however understood that application of the various processes of the invention may occur within a GD device 102 that is not connected to an external network, but receives the dataset via some other input means, such as multimedia input drive 240, analyst input, download from thumb drive via USB port, for example.

As further illustrated within FIG. 2 and described below, GD device 102 comprises (a) receiving utility for receiving the communication dataset and/or a graph representation of the communication dataset and (b) group detection utility, which is hereinafter collectively referred to as GD utility. As illustrated by FIG. 2, GD device 102 may be a data processing system, and is described as such within the following description of the invention.

Those of ordinary skill in the art will appreciate that the hardware depicted in FIG. 2 is a basic illustration of a computer device and may vary from system to system. Thus, the depicted example is not meant to imply architectural limitations with respect to the present invention.

A.1 GD Utility and Associated Algorithms and/or Processes

Notably, in addition to the above described hardware components of GD device 102, various features of the invention are provided as software code stored within memory 220 or other storage (not shown) and executed by CPU 210. Located within memory 220 and executed on CPU 210 are a number of software components, including operating system (OS) 225 (e.g., Microsoft Windows®, a trademark of Microsoft Corp, or GNU®/Linux®, registered trademarks of the Free Software Foundation and The Linux Mark Institute) and software applications, of which GD utility 235 is shown. In actual implementation, GD utility 235 may be loaded on to and executed by an existing computer system to provide the group detection features within that computer system, as described below.

CPU 210 executes GD utility 235 as well as OS 225, which supports the execution of GD utility 235. In the illustrative embodiment, several analyst interface features are enabled by GD utility 235 and supported by the OS 225 to enable analyst interaction with or manipulation of the parameters utilized during utility execution. Among the software code/algorithm provided by GD utility 235, which are specific to the invention, are (a) code for enabling the various group detection algorithms via one or both of Best friends (BF) detection methods and AutoBF methods, and (b) code for generating and displaying a GD console and enabling analyst setup, interaction and analyst output generation and display functionality. For simplicity, the collective body of code that enables these various features is referred to herein as GD utility. According to the illustrative embodiment, when CPU 210 executes GD utility 235, GD device 102 initiates a series of functional processes, corresponding to the GD features/functionality described herein and illustrated by FIGS. 4-5.

The flexibility of the BF and AutoBF GD algorithms means that the algorithms do not require a specific data format for receiving and compiling data. That is, the algorithms are able to process any data, where relationships among nodes are known. One way utilized by the invention to illustrate and analyze these relationships is through use of graph representation. A graph representation is ideal because edges define the relationships between two nodes. Relational databases may also be utilized, in other embodiments.

Thus, the invention generates a graph representation of individuals that communicate with each other and analyzes certain communication patterns to determine when a group exists. In an example graph showing a set of individuals, nodes represent various entities including, but not limited to, computers, people, organizations, objects, and events. Edges link nodes in the graph and represent relationships, such as interactions, ownership, and trust. Attributes store the details of each node and edge, such as a person's name or an interaction's time of occurrence.

B. Best Friends (BF) Algorithm (or Utility)

Figure 4A:
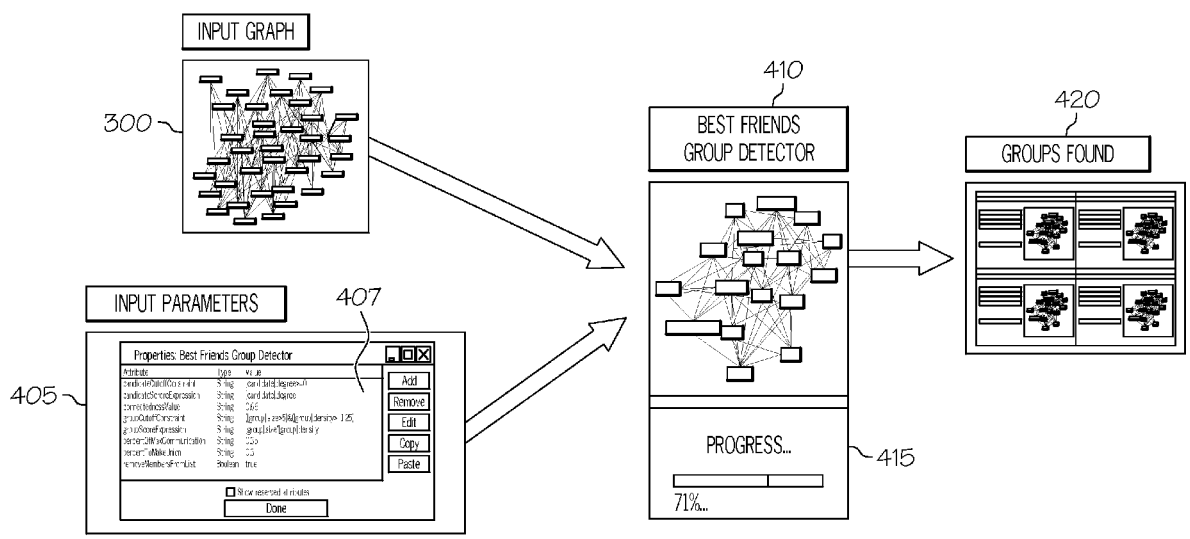
FIG. 4A provides an illustration of the application and generated results of the BF group detection algorithm within the dataset shown in FIG. 3, according to one embodiment of the invention.

The BF algorithm operates on a dataset such as that illustrated by FIG. 3 to yield a series of groups detected from within the dataset. FIG. 4A illustrates an example of the resulting groups 420 generated by applying the BF algorithm 410 (of GD utility 235) to the dataset 300 of FIG. 3. According to the illustrative embodiment, the dataset analysis and group generation features are completed on a computer system (i.e., GD device) following an input by the analyst of certain analyst parameters 407. These analyst parameters 407 are inputted via analyst interface 405 provided by the executing BF algorithm 410.

Figure 5:
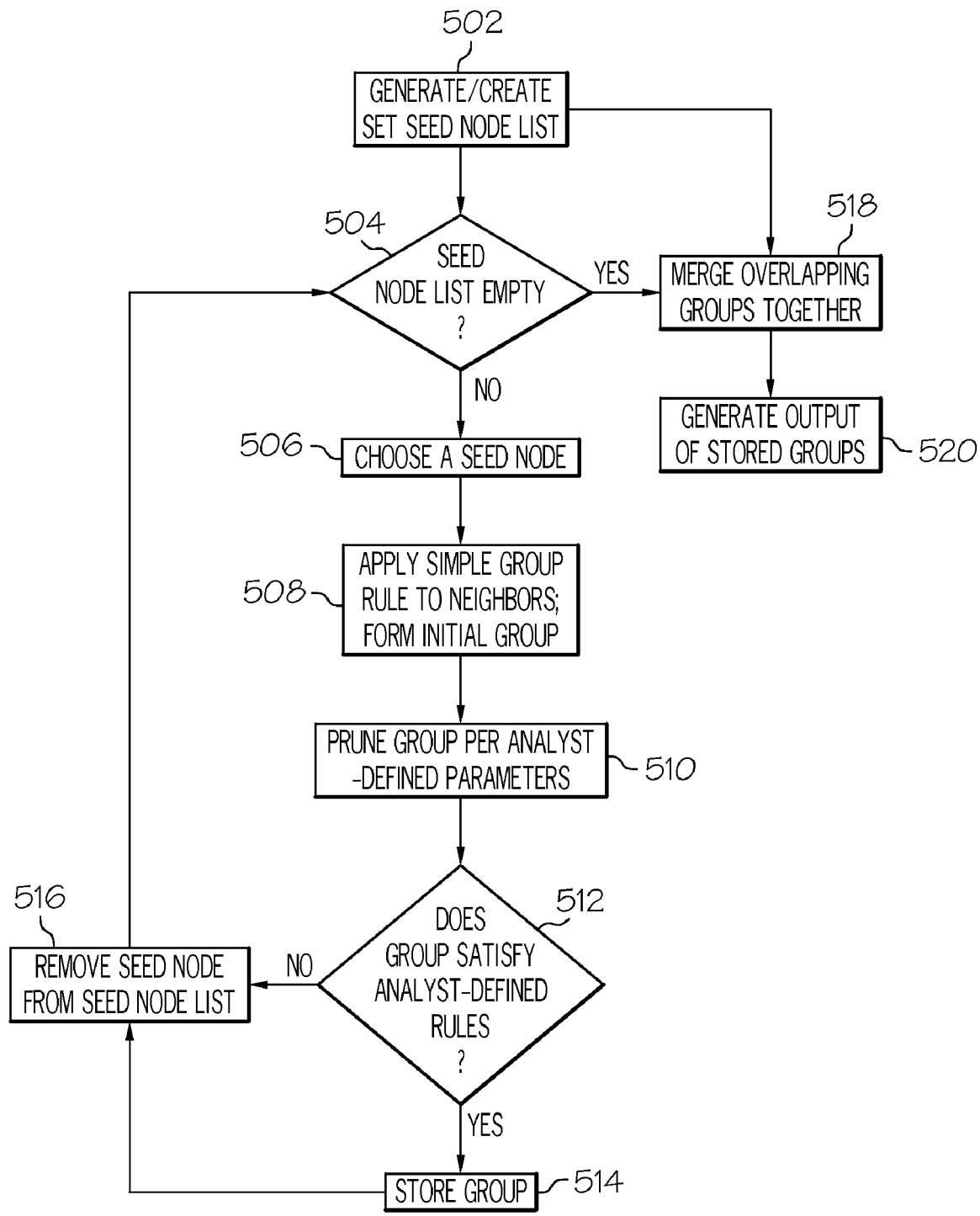
FIG. 5 is a flow chart illustrating the processes provided by execution of BF algorithm, in accordance with embodiments of the invention.
Figure 7:
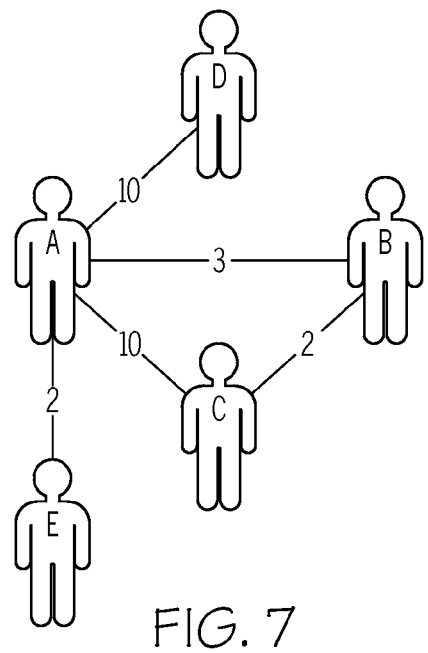
FIG. 7 provides a sample dataset utilized to further describe the operation of the BF and AutoBF algorithms as described by FIGS. 5 and 6.

With reference now to FIG. 5, there is illustrated a flowchart of the processing of the BF algorithm against a dataset according to one embodiment of the invention. For purposes of illustration and to provide a concrete example to the processing being described, reference is made to a simple dataset comprising 5 people (labeled A-E). This data set is illustrated by FIG. 7, which provides specific communication links among the individuals that are utilized to complement the description of FIG. 5.

The BF algorithm finds groups based on an input graph and a set of analyst-defined parameters. This algorithm is utilized when the analyst understands the general structure of the would-be groups. Several specific terms are utilized within the description of the BF algorithm and are defined as follows:

(a) Seed node: this is the data point/node (or entities) around which a group is built;

(b) Simple group rule: which states that if a node has a set of neighbors, a subgroup of those neighbors is able to form a group if the nodes in the subgroup are connected to most of the other nodes in the subgroup; and (c) Fitness function: an analyst defined level of solution quality (connectivity, group size, insularity), which is inputted by the analyst before applying the BF algorithm on the data set.

A list is now provided of additional, specific terms and corresponding definitions, which may be utilized within the described embodiments of the invention. Several of these additional terms are utilized within the following description and reference the simple group illustrated by FIG. 7. It is understood that the utilization of specific terms herein is provided solely for example and to aid in the description to the invention. Further, use of specific terms within the description is not meant to imply any limitations on the invention or the scope of the features described with reference to those terms or the invention.

# of max communications (for a node): the maximum number of communications that a node has with any other node. Ex: A's # of max communications is 10.

Best friend: a node's best friends are the nodes with whom it communicates most (see 1). Ex: A's best friends are C and D. B's best friend is A.

friend: a node's friends are defined as the nodes with whom it communicates relatively frequently. Ex: For nodes, such as A, that communicate often with other nodes, a high number of communications is required to be considered a friend (A's friends would be C and D). For nodes, such as B, that communicate rarely with other nodes, a low number of communications is required to be considered a friend (B's friends would be A and C).

percentOfMaxCommunication: # of communications needed with a particular node to be considered a friend of the node/# of max communications (see 1). Ex: If the percentOfMaxCommunications=0.40, then a node would need at least 0.40*10=4 communications to be a "friend" of A. To be a friend of B, a node would only need 0.4*3=1.2 communications (~2 if we round up to whole numbers).

candidateCutoffConstraint: an expression using SNA metrics to describe the qualities necessary to be a good seed to a group. Ex: The constraint[candidate].degree>=averageNodeValue([graph], "degree") means that good seeds should have a degree that is greater than or equal to the average degree of all nodes in the graph.

candidateScoreExpression: an expression used to order the group seeds. The expression will be evaluated for each seed, and the seed with the highest score will be used first to seed groups. Ex: The constraint [candidate].degree would cause the node with the highest degree to be the first seed for a group.

connectednessValue: the percentage of members in the group that an individual must be connected to in order to be part of the group. Ex: If the connectednessValue =0.66, then each member of the group must be connected to at least 66% of the group or more.

groupCutoffConstraint: an expression using SNA Metrics to define a good group. Ex: The constraint ([group].eiRatio<4.9) & ([group].density>=1.95) means that a group's eiRatio must be less than 4.9 and the group's density must be greater than or equal to 1.95.

percentToMakeUnion: this parameter (U) is used to form an initial group. If a node is friends with U percent of the seed-node's friends, then it is placed in the initial group, otherwise it is not considered part of the group. I.e. If U=0.40, B were the current node, and A were the seed-node, then B would need to be friends with 40% of A's friends to be considered part of the initial group.

groupScoreExpression: the parameter does not currently affect the Best Friend's Algorithm. It may be used in future versions of the algorithm.

Utilizing the above terminology within the illustration of FIG. 7, the predominant idea of the simple group rule within the illustrative embodiment is that a node has a set of neighbors, and that a subgroup of those neighbors forms a group if the nodes in the subgroup are connected to most of the other nodes in the subgroup. For example, if A is connected to B & C, and B & C are connected to each other, then A, B, & C form a group. Each such group begins with a "seed" node, and nodes with associations or links (edges) to the seed node are utilized to form an initial group.

The process of FIG. 5 begins at block 502, which illustrates that the BF algorithm of the GD utility generating a "seed" node list once the data set is made accessible to the GD utility. A check is performed at block 504 whether the seed node list is empty, and, when the seed node list is not empty, a seed node is chosen from the list, as indicated at block 506. At block 508, the BF algorithm applies the simple group rule to the neighbors of the selected seed node to form an initial group. As previously described, this simple group rule states that neighbors that are connected to many other neighbors in the same set are a likely group. The initial group is pruned according to the analyst-defined parameters, as shown at block 510. Then, the BF algorithm determines at block 512 whether the pruned groups satisfy certain analyst-defined rules (fitness functions). Groups meeting the analyst-defined rules are stored as a potential group, as indicated at block 514, and the seed node is removed from the seed node list in block 516. Other groups (or nodes) not meeting the analyst-defined rules are removed, as shown at block 516. For example, nodes that are not well-connected to the group may be removed.

The process repeats steps 506-518 until the seed node list is empty. When all seed nodes have been explored, groups with significant overlap are merged together, as provided at block 518. The resulting set of groups and merged groups are then made available for output to the analyst as shown at block 520.

A concrete example is described referencing the dataset illustrated in FIG. 7, and using the terms described above. The process is initiated by creating a "seed" node list. Seed node eligibility is determined by the analyst-defined parameter "candidateCutoffConstraint". In this example, an assumption made is that the analyst defines an eligible seed node as one whose degree (or number of neighbors) is greater than one. Given this parameter, persons A, B, and C would be placed into the seed node list. If the seed node list is not empty, a seed node is chosen from the list. Person A might be chosen as the initial seed node, for example. The Simple Group Rule, which states that neighbors that are "well-connected" to the seed node and linked to "many" other neighbors in the same set are a likely group, is applied to the seed node (Person A) to form an initial group.

According to described embodiment, the terms "well-connected" and "many" are provided specific definitions as applied to the GD algorithm. In this embodiment, well-connected is defined by the analyst through the parameter "percentOfMaxCommunication". For example, if "percentOfMaxCommunication" is defined by the analyst to be 0.3 (or 30%), a node is considered well-connected to the seed node if the node shares at least 30% as many edges with the seed node as the most well-connected neighbor. In this example, the most well-connected neighbors are Persons C and D because they share 10 edges with the seed node (Person A). Person B is considered well-connected because Person B shares 3 edges (or 30% of 10) with the seed node.

The word "many" is defined by the analyst through the parameter "percentToMakeUnion". For example, if "percentToMakeUnion" is defined by the analyst to be 0.5 (or 50%), a node may only belong to the initial group if the node is connected to at least 50% of the seed node's (Person A's) well-connected neighbors. In this example, Persons A, B, and C would form the initial group because they are connected to at least 50% of A's well-connected neighbors.

The initial group is now pruned according to the analyst-defined parameter "connectednessValue". For example, nodes may be removed if the nodes are not connected to enough of the other members in the initial group. In this example, none of the nodes in the initial group would be removed because every node is connected to every other node. Finally, the group is required to pass an analyst-defined fitness function. The fitness function may include a minimum group size, group density (i.e., number of total connections between team members), etc. For example, if the fitness function requires a group to be of size 3 or greater, the initial group of Persons A, B, and C would pass the analyst-defined fitness function.

The group is then stored, and the seed node (Person A) is be removed from the seed node list. As provided by the flow chart, these steps are repeated until the seed node list is empty. When the seed node list is empty, overlapping groups are merged, and the final groups are made available to the analyst. The BF utility may operate on a dataset such as that illustrated by FIG. 3 to yield a series of groups detected from within the dataset.

C. AutoBF Algorithm (or Utility)

Figure 4B:
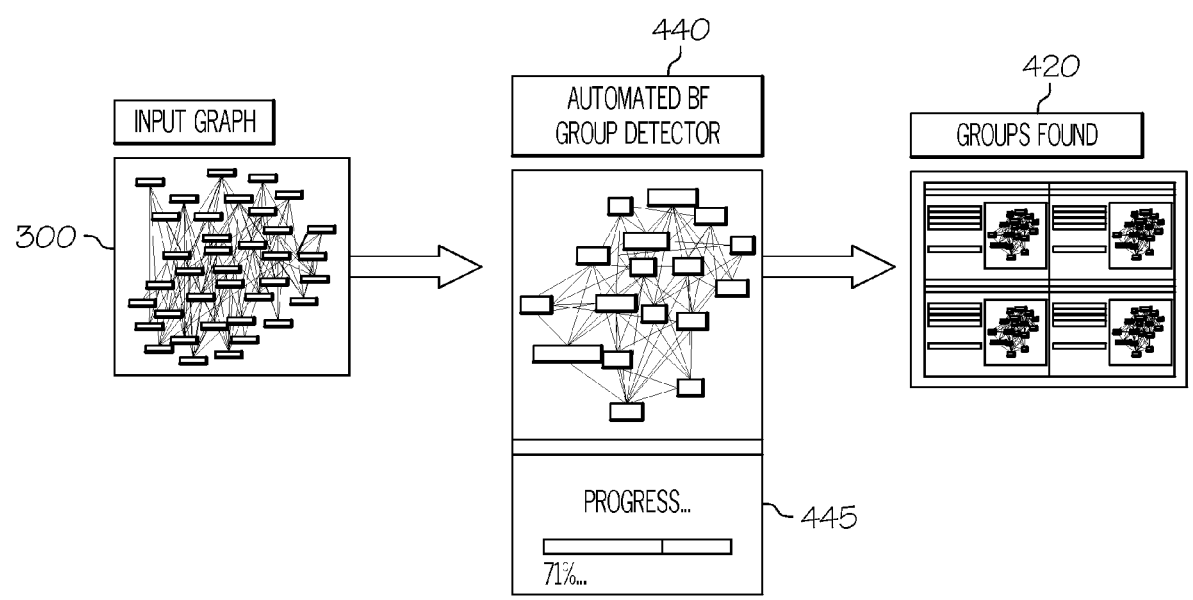
FIG. 4B provides an illustration of the application and generated results of the AutoBF group detection algorithm within the dataset shown in FIG. 3, according to one embodiment of the invention.

FIG. 4B illustrates an example of the resulting groups 450 generated by applying the AutoBF algorithm 440 (of GD utility 235) to the dataset 300 of FIG. 3. According to the illustrative embodiment, the dataset analysis and group generation features are completed on a computer system (i.e., GD device) (with no analyst input of parameters, e.g., fitness function, as with BF algorithm 410) provided by the executing AutoBF algorithm 440.

Figure 6:
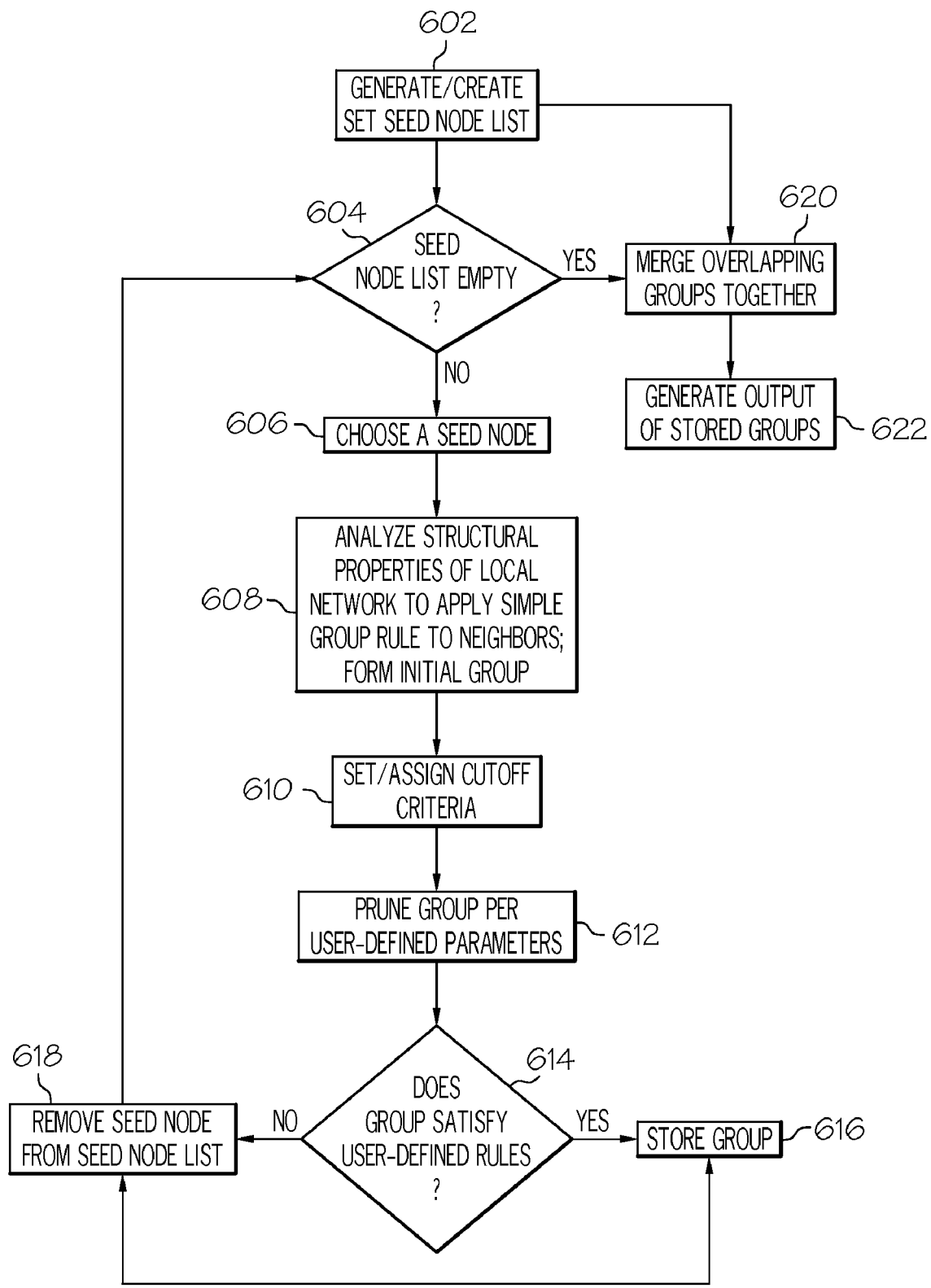
FIG. 6 is a flow chart illustrating the processes provided by execution of AutoBF algorithm, in accordance with embodiments of the invention.

FIG. 6 illustrates a flow chart of the processing of the AutoBF algorithm within a dataset, according to one embodiment of the invention. The processing of the AutoBF algorithm is somewhat similar to the BF algorithm, except that the AutoBF algorithm does not require a set of analyst-defined parameters (or fitness function). Instead of these analyst-defined parameters, AutoBF algorithm utilizes local neighborhood structure to determine pruning criteria. Thus, the AutoBF algorithm requires only an input graph to find groups, and thus the AutoBF algorithm is utilized when the analyst has little to no information about the general structure of the groups.

As shown at block 602, AutoBF algorithm begins with creation of a "seed" node list, similar to the BF algorithm. A check is performed at block 604 whether the seed node list is empty. When the seed node list is not empty, a seed node is chosen from the list, as shown at block 606. A modified Simple Group Rule is applied to the neighbors of the seed node to form an initial group, as shown at block 608. However, different from the BF algorithm, which utilizes the analyst-defined parameter "percentToMakeUnion" to apply the Simple Group Rule, the AutoBF algorithm utilizes statistical analysis and local network structure (properties) to dynamically determine a value for "percentToMakeUnion". For example, a node may belong to the group if it shares a statistically significant number of edges with the seed node. The size of the initial group is utilized to determine cutoff criteria, as stated in block 610. For example, nodes that belong to a smaller initial group are required to be connected to a higher percentage of neighbor nodes. In block 612, the initial group is pruned according to the cutoff criteria set.

The AutoBF algorithm determines, at block 614, whether the resulting/pruned group meets the cutoff criteria. The default behavior of autoBF (when no change is made by the analyst) is to simply check that the size of the group is greater than 3. If the group meets these requirements, the algorithm stores the group as a potential group, as provided at block 616. If the group does not meet these requirements, the seed node is removed, as indicted at block 618. The steps 604-618 are repeated until the seed node list is empty. When the seed node list is empty, groups with significant overlap are merged together, as shown at block 620. Finally, the resulting and merged groups are then made available for output to the analyst, as shown at block 622.

D. Specific Examples

Discovering underlying structure from co-occurrence data is an important task in a variety of fields, including: insurance, intelligence, criminal investigation, epidemiology, human resources, and marketing. Three non-synthetic datasets that the above described group detection algorithms have been tested on are described below. These datasets are the Sageman dataset, the NCAA dataset, and the hep-th-citations dataset, and are respectively illustrated by FIGS. 8A-8C.

As described above, the Sageman dataset was produced from public sources by Professor Marc Sageman and contains information about members in the Al Qaeda network. The groups found show members that are highly connected by relationships such as "religiousTeacherOf" and "relativeOf". The colors of the nodes are indicative of where the person joined the jihad. Thus, as shown, in one embodiment, the functional features of the invention (i.e., electronic Group Detection) are utilized to revolutionize how terrorist cells are detected.

The NCAA dataset represents the NCAA basketball playoff season of 2004-2005. Each team is represented as a node in the graph, and each game is represented as an edge between the nodes (schools) that participated in the game. The resulting groups include schools that belong to the same conference because in-conference schools play each other more often than out-of-conference schools.

The hep-th-citations dataset comes from the 2003 KDD Cup, and was based on citation information from the field of high-energy physics between the years 1992 and 2003. Each paper is represented as a node, and each citation is represented as an edge from the citing paper to the cited paper. The resulting groups show papers that cite each other and that are (presumably) related to a particular topic in the field of physics.

Figure 8A:
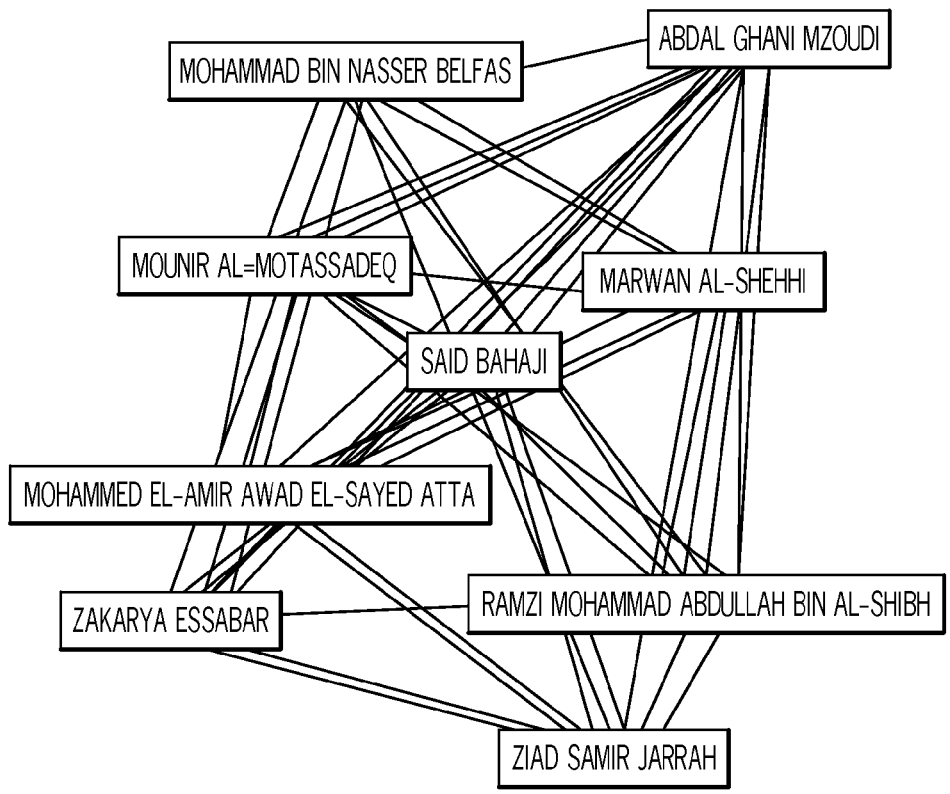
FIGS. 8A-8C illustrate real world examples of data sets within which the BF and AutoBF algorithms of the present invention may be applied, in accordance with embodiments of the invention.
Figure 8B:
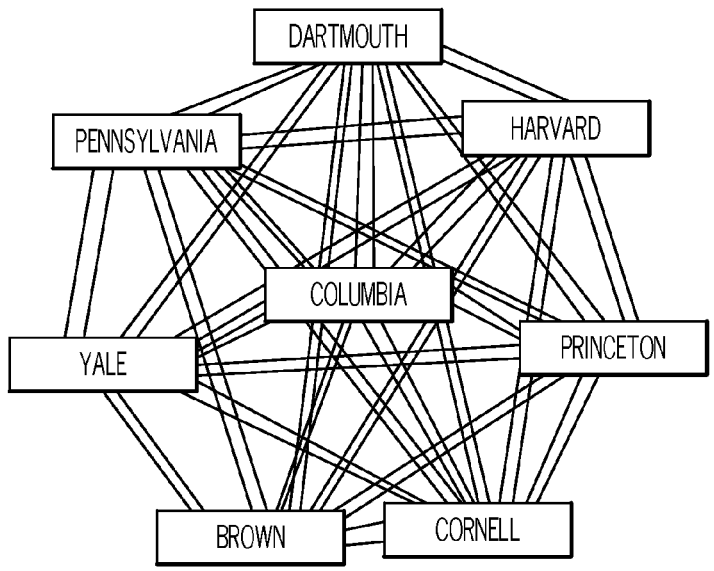
Figure 8C:
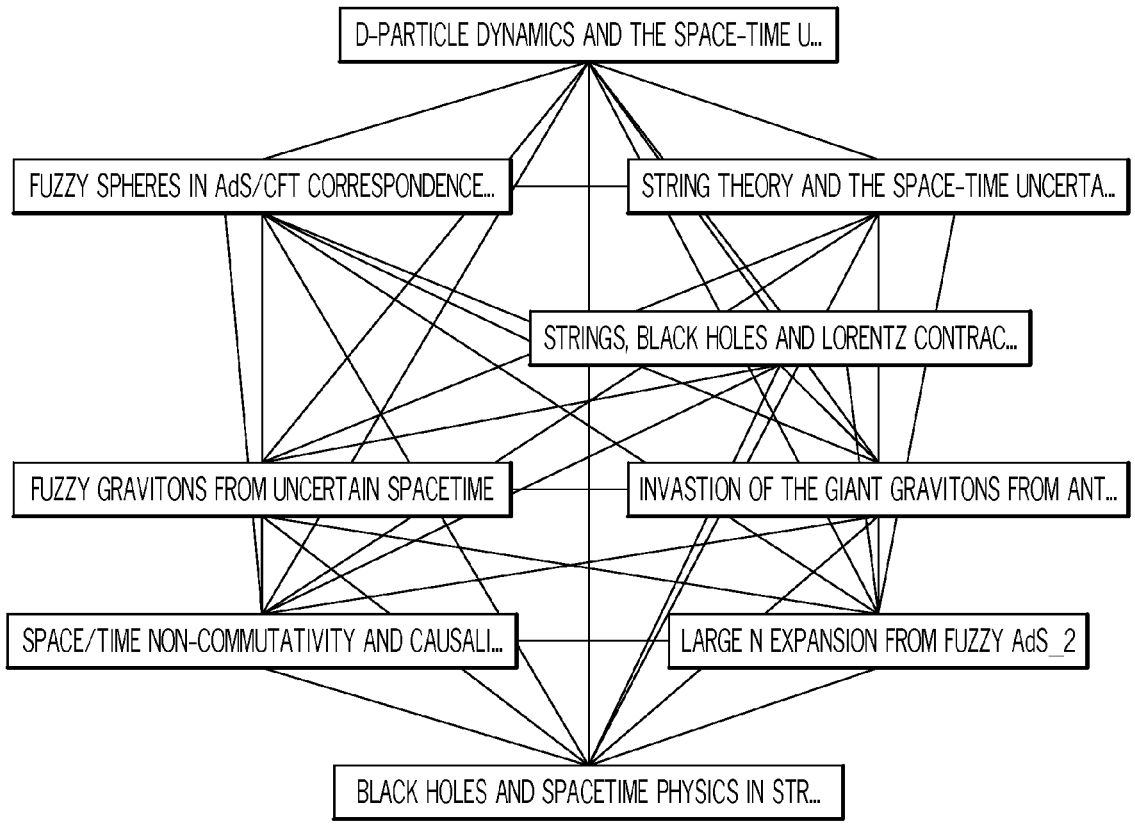
Figure 9:
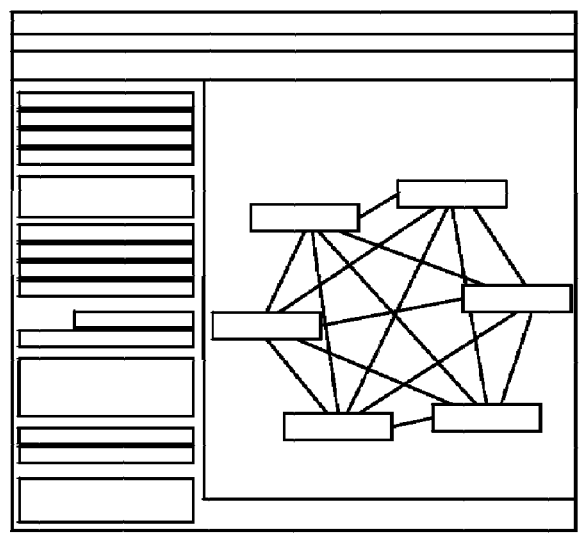
FIGS. 9 and 10 illustrate groups identified utilizing one of BF algorithm and AutoBF algorithm that exhibit an "alias" pattern and a "courier" pattern, respectively, in accordance with the invention.
Figure 10:
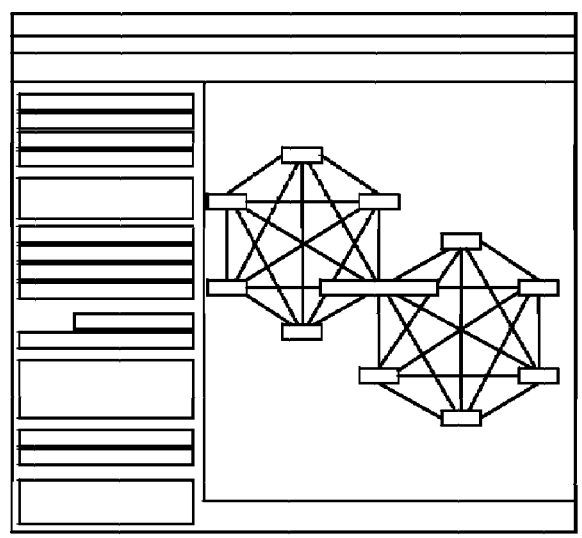

FIG. 8A shows a group that was discovered by the AutoBF algorithm while running on the Sageman dataset. The dataset, produced by Professor Marc Sageman of UPenn, contains information about members of the Al Qaeda network and was compiled from a wide variety of public sources.

The first "seed" node in the algorithm's list might be the center node, "Said Bahaji". Said Bahaji is connected to Zakarya Essabar, Ziad Samir Jarrah, etc., and perhaps a number of other people who are not shown (call them A, B, C, and D). The algorithm would use the "Simple Group Rule" to produce an initial group. The "Simple Group Rule" is equivalent to asking "Which of Said's friends know a lot of Said's other friends?" The "Simple Group Rule" would decide that Zakarya Essabar will be part of the initial group because he is friends with many of Said's other friends. Person A (not shown) would NOT be included in the initial group because he is not connected to enough of Said's friends. Once the initial group is created, the group is pruned by removing members who are not connected to enough of the other members. Members can also be added if they are friends with many of the group members, but not friends with the "seed" node (Said). The group is stored as a potential group only after it passes the "group fitness function" test. In the BF algorithm, the fitness function is defined by the analyst. In the AutoBF algorithm, the default behavior simply requires groups to consist of 3 or more nodes.

Initial tests show that the AutoBF algorithm performs well and produces a high percentage of conclusive groups. Additionally, the overall time needed to find a group using the AutoBF algorithm is significantly reduced because an expert or separate parameter-setting algorithm is not required. Even novice analysts are able to find groups in datasets that they are unfamiliar with.

In addition to providing group membership information, the GD utility of invention may be utilized to find couriers between groups and possible aliases. For example, FIG. 5 shows a group where every member is connected to every other member with one exception—Clark Kent is not connected to Superman. This pattern is indicative of an alias. The two members who are not connected are probably the same person. Also, FIG. 6 shows two groups that are connected through a single person. This person is known as a courier. In the illustrated example, the Student Body President is the liaison between the Jocks and the Nerds.

Other Embodiments and Results

The processes of the invention enable the automatic identification of the social groups or cliques in the population of a large number of people entered as a dataset. The invention further enables introspective applications, which include: (a) identify and observe collaborations; (b) detect and facilitate ad-hoc teams; and (c) identify and integrate potentially isolated schools of thought. The invention further enables external looking applications, which include: (a) identify and track overt groups; (b) detect and identify covert groups; and (c) seed further SNA (social network analysis) functions to categorize groups' activities.

One of the major benefits of using the group detection algorithms described herein is that the algorithms address a problem that other group detection algorithms have not been able to address; i.e., the algorithms work well on non-noisy data. Moreover, the AutoBF algorithm addresses the other major shortcoming that other group detection algorithms haven't been able to address, which is removing the need to set analyst parameters. Removing the need to set parameters turns the autoBF group detection algorithm into a "one-click" solution.

In one embodiment, the process of locating groups is completed in a matter of seconds with a single analyst input via an input device such as a mouse (e.g., a click of the mouse). The described embodiments of the invention provide group detection algorithms that are flexible, so that expert analysts are able to set parameters to tailor the algorithms to a particular dataset. The algorithms are also general enough that analysts are able to find groups without knowing anything about the dataset. Tests performed on a large government database have shown that the Best Friends algorithm produces 125 (83%) valid groups, 0 (0%) invalid groups, and 25 (17%) inconclusive groups. From these numbers, it is clear that employing this algorithm results in incredibly accurate results, and is an improvement over current methods of group detection.

Other embodiments of the invention provide several other functional features including: (1) automatically setting parameters; (2) exploring the underlying reasons that nodes are grouped together, in addition to grouping based on communication patterns. For example, understanding traits that the members of the group share, such as physical location, interests, etc.; (3) discovering new patterns of groups, such as the "star pattern" group; (4) completing large scale group detection on datasets with $10^8$ nodes or more; and (5) analyzing changes in group structure over time.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a method comprising:
systematically analyzing a data set of entities within a network having one or more interconnections amongst the entities that indicates relationships between the one or more entities;
dynamically identifying one or more groups from within the data set that satisfy pre-established grouping criteria, which criteria collectively indicates specific relationships between the entities within a specific group relative to other entities within the specific group;

determining which identified groups among the one or more groups have overlaps greater than a pre-established maximum overlap;

merging groups having overlaps greater than the pre-established maximum overlap to generated merged groups; and outputting a result set of groups including the merged groups and other potential groups for evaluation as groups of interest.

2. In a data processing system, a method comprising:

systematically analyzing a data set of entities within a network having one or more interconnections amongst the entities that indicates relationships between the one or more entities; and dynamically identifying one or more groups from within the data set that satisfy pre-established grouping criteria, which criteria collectively indicates specific relationships between the entities within a specific group relative to other entities within the specific group;

receiving the data set of entities within a network as an input graph of nodes representing each entity interconnected by edges defining relationships between two or more entities, said relationships including interactions, ownership, and trust;

wherein each node and connected edges are provided attributes, which store the details of the node and the connected edges, such as an entity's identification (ID) and a time of occurrence for a specific interaction represented by one of the connected edges;

performing said analyzing and identifying within the input graph, such that each of said one or more groups include a minimum number of nodes connected by edges that meet specific grouping criteria;

generating a "seed" node list utilizing a pre-defined constraint parameter, wherein an eligible seed node can be pre-defined by an analyst as a node which has certain properties including, but not limited to, minimum degree (number of neighbors), minimum centrality, etc.; and linking neighbors that are "well-connected" to the seed node and neighbors that are linked to "many" other neighbors in the same set as an initial group;

wherein a well-connected neighbor is pre-defined to be a neighbor node which shares at least X % as many edges with the seed node as the most well-connected neighbor, wherein X % is a selected one of a first default parameter or a first analyst-defined parameter, respectively selected based on execution of a first group detection algorithm or a second group detection algorithm;

wherein the many other neighbors indicates that a node may only belong to the initial group if the node is connected to at least Y % of the seed node's well-connected neighbors, wherein Y % is a selected one of a second default parameter or a second analyst-defined parameter, respectively selected based on execution of a first group detection algorithm or a second group detection algorithm.

3. The method of claim 2, further comprising:

generating and displaying a user interface within which the input graph is illustrated;

enabling selective analyst input via the user interface of specific analyst-defined parameters for utilization when a first group detection algorithm is initiated;

running a first group detection algorithm when the analyst input is received;

wherein default parameters are used when no analyst input is received; and displaying an output of the one or more groups detected within the input graph following completion of the specific group detection algorithm's processing of the input graph.

4. The method of claim 2, wherein said identifying further comprises:

identifying the one or more groups from within the input graph utilizing a first group detection algorithm utilized when a set of analyst-defined parameters are provided along with the input graph, said analyst-defined parameters indicating an understanding by the analyst of a general structure of potential groups within the input graph that is defined by the grouping criteria, wherein the first group detection algorithm requires both the input graph and the analyst-defined parameters to perform the group detection.

5. The method of claim 4, wherein said identifying the one or more groups from within the input graph utilizing the first group detection algorithm further comprises:

receiving an input by an analyst of specific analyst-defined parameters, wherein said analyst-defined parameters are inputted via a user interface or text file provided by the first group detection algorithm;

identifying one or more seed nodes, wherein said one or more seed nodes represent a selected node within the input data around which a group is built;

applying a simple group rule to form initial groups, wherein if a node has a set of neighbors, a subgroup of those neighbors is utilized to form the initial group if the nodes in the subgroup are connected to a substantial number of the other nodes in the subgroup;

pruning the initial groups according to a pre-defined level of connectedness, wherein said pruning comprises deleting one or more nodes within the group that are not well-connected to the other nodes within the group based on the pre-defined level of connectedness;

evaluating the initial groups against a fitness function test, wherein the initial group is required to pass the fitness function test before being accepted as a potential group of interest, wherein the fitness function test can include (1) a minimum group size representing a pre-set number of nodes to form a group of interest and (2) a group density representing a number of total connections between group members;

when an initial group passes the fitness function test, storing the initial group in a set of potential groups of interest;

when the initial group does not pass the fitness function test, discarding the initial group; and removing the seed node from the seed node list.

6. The method of claim 2, wherein said identifying further comprises:

identifying the one or more groups from within the input graph utilizing a second group detection algorithm when no analyst-defined parameters are provided along with the input graph, such that the second group detection algorithm detects the one or more groups utilizing said input graph along with a dynamically-determined, local neighborhood structure from within the input graph to confirm each identified group.

7. The method of claim 6, further comprising:

when no analyst-defined parameters are provided as an input, initiating the second group detection algorithm to complete the group detection utilizing the local neighborhood structure in lieu of analyst-defined parameters to determine pruning criteria;

applying the simple group rule to the neighbors of the seed node to form an initial group;

performing statistical analysis utilizing a local network structure to dynamically determine a value for a specific level of connectedness utilized in evaluating each initial group, wherein an initial group that exhibits the specific level of connectedness is provided as a group of interest;

determining a minimum size of an initial group relative to a density of interconnectivity among members within the initial group in order to establish cutoff criteria, wherein nodes that belong to a smaller initial group are required to be connected to a higher percentage of neighbor nodes within the smaller initial group to enable the smaller initial group to be tagged as a potential group of interest;

automatically pruning the initial group according to the determined cutoff criteria if the initial group meets the cutoff criteria, wherein a cutoff criteria processing is established, which checks that the size of the initial group is at least as big as a pre-established minimum group size; and when the initial group meets the cutoff criteria, storing the initial group as a potential group of interest.

8. In a data processing system, a method comprising:

systematically analyzing a data set of entities within a network having one or more interconnections amongst the entities that indicates relationships between the one or more entities: and dynamically identifying one or more groups from within the data set that satisfy pre-established grouping criteria, which criteria collectively indicates specific relationships between the entities within a specific group relative to other entities within the specific group;

receiving the data set of entities within a network as an input graph of nodes representing each entity interconnected by edges defining relationships between two or more entities, said relationships including interactions, ownership, and trust;

wherein each node and connected edges are provided attributes, which store the details of the node and the connected edges, such as an entity's identification (ID) and a time of occurrence for a specific interaction represented by one of the connected edges;

performing said analyzing and identifying within the input graph, such that each of said one or more groups include a minimum number of nodes connected by edges that meet specific grouping criteria;

analyzing relationship patterns among the individuals to determine when a group exists; and dynamically determining aliases for members within a potential groups of interest, wherein when an exception to a group of interest is identified such that every member is connected to every other member of the group with one exception, the exception is marked as one that is indicative of an alias, whereby the two members within the group of interest that are not connected are identified as potentially the same member having an alias identity within the group.

9. In a data processing system, a method comprising:

systematically analyzing a data set of entities within a network having one or more interconnections amongst the entities that indicates relationships between the one or more entities;

dynamically identifying one or more groups from within the data set that satisfy pre-established grouping criteria, which criteria collectively indicates specific relationships between the entities within a specific group relative to other entities within the specific group;

identifying individual nodes that connect two groups together;

tagging the individual node as a potential courier between the two groups;

performing intra-spective analysis of the groups and nodes, including one or more of the following: (a) identifying and observing collaborations; (b) detecting and facilitating ad-hoc teams; and (c) identifying and integrating potentially isolated schools of thought; and performing extra-spective analysis of the groups and nodes, including one or more of the following: (a) identifying and tracking overt groups; (b) detecting and identifying covert groups; and (c) seeding further SNA (social network analysis) functions to categorize a group's activities.

10. In a data processing system, a method comprising:

systematically analyzing a data set of entities within a network having one or more interconnections amongst the entities that indicates relationships between the one or more entities: and dynamically identifying one or more groups from within the data set that satisfy pre-established grouping criteria, which criteria collectively indicates specific relationships between the entities within a specific group relative to other entities within the specific group;

receiving the data set of entities within a network as an input graph of nodes representing each entity interconnected by edges defining relationships between two or more entities, said relationships including interactions, ownership, and trust;

wherein each node and connected edges are provided attributes, which store the details of the node and the connected edges, such as an entity's identification (ID) and a time of occurrence for a specific interaction represented by one of the connected edges;

performing said analyzing and identifying within the input graph, such that each of said one or more groups include a minimum number of nodes connected by edges that meet specific grouping criteria;

providing a focused set of entities for evaluating shared traits of an identified group of interest, including physical location, activities, and interests provided as attributes linked to respective nodes; and analyzing changes in a group structure over time and outputting said changes for evaluation.

11. A computer program product comprising:

a computer readable storage medium; and program code on the computer readable storage medium that when executed by a processing device implements the following functions:

systematically analyzing a data set of entities within a network having one or more interconnections amongst the entities that indicates relationship patterns between the one or more entities;

dynamically identifying one or more groups from within the data set that satisfy pre-established grouping criteria, which criteria collectively indicates specific relationships between the entities within a specific group relative to other entities within the specific group;

determining which identified groups among the one or more groups have overlaps greater than a pre-established maximum overlap;

merging groups having overlaps greater than the pre-established maximum overlap to generated merged groups; and outputting a result set of groups including the merged groups and other potential groups for evaluation as groups of interest.

12. The computer program product of claim 11, further comprising program code for:

generating and displaying a user interface within which the input graph is illustrated;

enabling selective analyst input via the user interface of specific analyst-defined parameters for utilization when a first group detection algorithm is initiated;

triggering a first group detection algorithm when the analyst input is received, wherein default parameters are used when no analyst input is received; and displaying an output of the one or more groups detected within the input graph following completion of the specific group detection algorithm's processing of the input graph.

13. A computer program product comprising:

a computer readable storage medium; and program code on the computer readable medium that when executed by a processing device implements the following functions:

systematically analyzing a data set of entities within a network having one or more interconnections amongst the entities that indicates relationship patterns between the one or more entities;

dynamically identifying one or more groups from within the data set that satisfy pre-established grouping criteria, which criteria collectively indicates specific relationships between the entities within a specific group relative to other entities within the specific group;

receiving the data set of entities within a network as an input graph of nodes representing each entity interconnected by edges defining communication relationships between two or more entities, said relationships including interactions, ownership, and trust;

wherein each node and connected edges are provided attributes, which store the details of the node and the connected edges, such as an entity's identification (ID) and a time of occurrence for a specific interaction represented by one of the connected edges;

performing said analyzing and identifying within the input graph, such that each of said one or more groups include a minimum number of nodes connected by edges that meet specific grouping criteria;

generating a "seed" node list utilizing a pre-defined constraint parameter, wherein an eligible seed node can be pre-defined by an analyst as a node which has certain properties including, but not limited to, minimum degree (number of neighbors), minimum centrality, etc.; and linking neighbors that are "well-connected" to the seed node and neighbors that are linked to "many" other neighbors in the same set as an initial group;

wherein a well-connected neighbor is pre-defined to be a neighbor node which shares at least X % as many edges with the seed node as the most well-connected neighbor, wherein X % is a selected one of a first default parameter or a first analyst-defined parameter on execution of a first group detection algorithm;

wherein the many other neighbors indicates that a node may only belong to the initial group if the node is connected to at least Y % of the seed node's well-connected neighbors, wherein Y % is a selected one of a second default parameter or a second analyst-defined parameter on execution of a first group detection algorithm.

14. The computer program product of claim 13, wherein said program code for identifying further comprises code for:

identifying the one or more groups from within the input graph utilizing a first group detection algorithm utilized when a set of analyst-defined parameters are provided along with the input graph, said analyst-defined parameters indicating an understanding by the analyst of a general structure of potential groups within the input graph that is defined by the grouping criteria, wherein the first group detection algorithm requires both the input graph and the analyst-defined parameters to perform the group detection.

15. The computer program product of claim 14, wherein said program code for identifying the one or more groups from within the input graph utilizing the firstgroup detection algorithm further comprises code for:

receiving an input by an analyst of specific analyst-defined parameters, wherein said analyst-defined parameters are inputted via a user interface provided by the first group detection algorithm;

identifying one or more seed nodes, wherein said one or more seed nodes represent a selected node within the input data around which a group is built;

applying a simple group rule to form initial groups, wherein if a node has a set of neighbors, a subgroup of those neighbors is utilized to form the initial group if the nodes in the subgroup are connected to a substantial number of the other nodes in the subgroup;

pruning the initial groups according to a pre-defined level of connectedness, wherein said pruning comprises deleting one or more nodes within the group that are not well-connected to the other nodes within the group based on the pre-defined level of connectedness;

evaluating the initial groups against a fitness function test, wherein the initial group is required to pass the fitness function test before being accepted as a potential group of interest, wherein the fitness function test can include (1) a minimum group size representing a pre-set number of nodes to form a group of interest and (2) a group density representing a number of total connections between group members;

when an initial group passes the fitness function test, storing the initial group in a set of potential groups of interest;

when the initial group does not pass the fitness function test, discarding the initial group; and removing the seed node from the seed node list.

16. The computer program product of claim 13, wherein said program code for identifying further comprises code for:

identifying the one or more groups from within the input graph utilizing a second group detection algorithm when no analyst-defined parameters are provided along with the input graph, such that the second group detection algorithm detects the one or more groups utilizing said input graph along with a dynamically-determined, local neighborhood structure from within the input graph to confirm each identified group.

17. The computer program product of claim 16, further comprising program code for:

when no analyst-defined parameters are provided as an input, initiating the second group detection algorithm to complete the group detection utilizing the local neighborhood structure in lieu of analyst-defined parameters to determine pruning criteria;

applying the simple group rule to the neighbors of the seed node to form an initial group;

performing statistical analysis utilizing a local network structure to dynamically determine a value for a specific level of connectedness utilized in evaluating each initial group, wherein an initial group that exhibits the specific level of connectedness is provided as a group of interest;

determining a minimum size of an initial group relative to a density of interconnectivity among members within the initial group in order to establish cutoff criteria, wherein nodes that belong to a smaller initial group are required to be connected to a higher percentage of neighbor nodes within the smaller initial group to enable the smaller initial group to be tagged as a potential group of interest;

automatically pruning the initial group according to the determined cutoff criteria if the initial group meets the cutoff criteria, wherein a cutoff criteria processing is established, which checks that the size of the initial group is at least as big as a pre-established minimum group size; and when the initial group meets the cutoff criteria, storing the initial group as a potential group of interest.

18. A computer program product comprising:

a computer readable storage medium; and program code on the computer readable medium that when executed by a processing device implements the following functions:

systematically analyzing a data set of entities within a network having one or more interconnections amongst the entities that indicates relationship patterns between the one or more entities;

dynamically identifying one or more groups from within the data set that satisfy pre-established grouping criteria, which criteria collectively indicates specific relationships between the entities within a specific group relative to other entities within the specific group;

receiving the data set of entities within a network as an input graph of nodes representing each entity interconnected by edges defining communication relationships between two or more entities, said relationships including interactions, ownership, and trust;

wherein each node and connected edges are provided attributes, which store the details of the node and the connected edges, such as an entity's identification (ID) and a time of occurrence for a specific interaction represented by one of the connected edges;

performing said analyzing and identifying within the input graph, such that each of said one or more groups include a minimum number of nodes connected by edges that meet specific grouping criteria;

analyzing relationship patterns among the individuals to determine when a group exists; and dynamically determining aliases for members within a potential groups of interest, where in when an exception to a group of interest is identified such that every member is connected to every other member of the group with one exception, the exception is marked as one that is indicative of an alias, whereby the two members within the group of interest that are not connected are identified as potentially the same member having an alias identity within the group.

19. A computer program product comprising:

a computer readable storage medium; and program code on the computer readable storage medium that when executed by a processing device implements the following functions:

systematically analyzing a data set of entities within a network having one or more interconnections amongst the entities that indicates relationship patterns between the one or more entities;

dynamically identifying one or more groups from within the data set that satisfy pre-established grouping criteria, which criteria collectively indicates specific relationships between the entities within a specific group relative to other entities within the specific group;

identifying individual nodes that connect two groups together;

tagging the individual node as a potential courier between the two groups;

performing intra-spective analysis of the groups and nodes, including one or more of the following: (a) identifying and observing collaborations; (b) detecting and facilitating ad-hoc teams; and (c) identifying and integrating potentially isolated schools of thought; and performing extra-spective analysis of the groups and nodes, including one or more of the following: (a) identifying and tracking overt groups; (b) detecting and identifying covert groups; and (c) seeding further SNA (social network analysis) functions to categorize a group's activities.

20. A computer program product comprising:

a computer readable storage medium; and program code on the computer readable medium that when executed by a processing device implements the following functions:

systematically analyzing a data set of entities within a network having one or more interconnections amongst the entities that indicates relationship patterns between the one or more entities;

dynamically identifying one or more groups from within the data set that satisfy pre-established grouping criteria, which criteria collectively indicates specific relationships between the entities within a specific group relative to other entities within the specific group;

receiving the data set of entities within a network as an input graph of nodes representing each entity interconnected by edges defining communication relationships between two or more entities, said relationships including interactions, ownership, and trust;

wherein each node and connected edges are provided attributes, which store the details of the node and the connected edges, such as an entity's identification (ID) and a time of occurrence for a specific interaction represented by one of the connected edges;

performing said analyzing and identifying within the input graph, such that each of said one or more groups include a minimum number of nodes connected by edges that meet specific grouping criteria;

providing a focused set of entities for evaluating shared traits of an identified group of interest, including physical location, activities, and interests provided as attributes linked to respective nodes; and analyzing changes in a group structure over time and outputting said changes for evaluation.

21. A data processing device comprising:
a processor;
a group detection utility that when executed on the processor provides the functions of:
systematically analyzing a data set of entities within a network having one or more interconnections amongst the entities that indicates relationship patterns between the one or more entities;
dynamically identifying one or more groups from within the data set that satisfy pre-established grouping criteria, which criteria collectively indicates specific relationships between the entities within a specific group relative to other entities within the specific group;
determining which identified groups among the one or more groups have overlaps greater than a pre-established maximum overlap;
merging groups having overlaps greater than the pre-established maximum overlap to generated merged groups; and
outputting a result set of groups including the merged groups and other potential groups for evaluation as groups of interest.

22. The data processing device of claim 21, wherein said group detection utility further comprises program code for:
receiving the data set of entities within a network as an input graph of nodes representing each entity interconnected by edges defining relationships between two or more entities, said relationships including interactions, ownership, and trust;
wherein each node and connected edges are provided attributes, which store the details of the node and the connected edges, such as an entity's identification (ID) and a time of occurrence for a specific interaction represented by one of the connected edges; and
performing said analyzing and identifying within the input graph, such that each of said one or more groups include a minimum number of nodes connected by edges that meet specific grouping criteria.

23. The data processing device of claim 22, wherein said group detection utility further comprises program code for:
generating and displaying a user interface within which the input graph is illustrated;
enabling selective analyst input via the user interface of specific analyst-defined parameters for utilization when a first group detection algorithm is initiated;
triggering a first group detection algorithm when the analyst input is received, wherein default parameters are used when no analyst input is received; and
displaying an output of the one or more groups detected within the input graph following completion of the specific group detection algorithm's processing of the input graph.

24. The data processing device of claim 22, wherein said group detection utility further comprises program code for:
generating a "seed" node list utilizing a pre-defined constraint parameter, wherein an eligible seed node can be pre-defined by an analyst as a node which has certain properties including, but not limited to, minimum degree (number of neighbors), minimum centrality, etc.; and
linking neighbors that are "well-connected" to the seed node and neighbors that are linked to "many" other neighbors in the same set as an initial group;
wherein a well-connected neighbor is pre-defined to be a neighbor node which shares at least X % as many edges with the seed node as the most well-connected neighbor, wherein X % is a selected one of a first default parameter or a first analyst-defined parameter on execution of a first group detection algorithm. A second group detection algorithm utilizes a dynamically generated parameter;
wherein the many other neighbors indicates that a node may only belong to the initial group if the node is connected to at least Y % of the seed node's well-connected neighbors, wherein Y % is a selected one of a second default parameter or a second analyst-defined parameter on execution of a first group detection algorithm. A second group detection algorithm utilizes a dynamically generated parameter.

25. The data processing device of claim 24, wherein said program code for identifying further comprises code for:
identifying the one or more groups from within the input graph utilizing a first group detection algorithm utilized when a set of analyst-defined parameters are provided along with the input graph, said analyst-defined parameters indicating an understanding by the analyst of a general structure of potential groups within the input graph that is defined by the grouping criteria, wherein the first group detection algorithm requires both the input graph and the analyst-defined parameters to perform the group detection.

26. The data processing device of claim 25, wherein said program code for identifying the one or more groups from within the input graph utilizing the first group detection algorithm further comprises code for:
receiving an input by an analyst of specific analyst-defined parameters, wherein said analyst-defined parameters are inputted via a user interface provided by the first group detection algorithm;
identifying one or more seed nodes, wherein said one or more seed nodes represent a selected node within the input data around which a group is built;
applying a simple group rule to form initial groups, wherein if a node has a set of neighbors, a subgroup of those neighbors is utilized to form the initial group if the nodes in the subgroup are connected to a substantial number of the other nodes in the subgroup;
pruning the initial groups according to a pre-defined level of connectedness, wherein said pruning comprises deleting one or more nodes within the group that are not well-connected to the other nodes within the group based on the pre-defined level of connectedness;
evaluating the initial groups against a fitness function test, wherein the initial group is required to pass the fitness function test before being accepted as a potential group of interest, wherein the fitness function test can include (1) a minimum group size representing a pre-set number of nodes to form a group of interest and (2) a group density representing a number of total connections between group members;
when an initial group passes the fitness function test, storing the initial group in a set of potential groups of interest;
when the initial group does not pass the fitness function test, discarding the initial group; and
removing the seed node from the seed node list.

27. The data processing device of claim 24, wherein said program code for identifying further comprises code for:
identifying the one or more groups from within the input graph utilizing a second group detection algorithm when no analyst-defined parameters are provided along with the input graph, such that the second group detection algorithm detects the one or more groups utilizing said input graph along with a dynamically-determined, local neighborhood structure from within the input graph to confirm each identified group.

28. The data processing device of claim 27, wherein said program code for identifying the one or more groups from within the input graph utilizing the second group detection algorithm further comprises program code for:

when no analyst-defined parameters are provided as an input, initiating the second group detection algorithm to complete the group detection utilizing the local neighborhood structure in lieu of analyst-defined parameters to determine pruning criteria;

applying the simple group rule to the neighbors of the seed node to form an initial group;

performing statistical analysis utilizing a local network structure to dynamically determine a value for a specific level of connectedness utilized in evaluating each initial group, wherein an initial group that exhibits the specific level of connectedness is provided as a group of interest;

determining a minimum size of an initial group relative to a density of interconnectivity among members within the initial group in order to establish cutoff criteria, wherein nodes that belong to a smaller initial group are required to be connected to a higher percentage of neighbor nodes within the smaller initial group to enable the smaller initial group to be tagged as a potential group of interest;

automatically pruning the initial group according to the determined cutoff criteria if the initial group meets the cutoff criteria, wherein a cutoff criteria processing is established, which checks that the size of the initial group is at least as big as a pre-established minimum group size; and when the initial group meets the cutoff criteria, storing the initial group as a potential group of interest.

29. The data processing device of claim 22, wherein said group detection utility further comprises program code for:

analyzing relationship patterns among the individuals to determine when a group exists; and dynamically determining aliases for members within a potential groups of interest, wherein when an exception to a group of interest is identified such that every member is connected to every other member of the group with one exception, the exception is marked as one that is indicative of an alias, whereby the two members within the group of interest that are not connected are identified as potentially the same member having an alias identity within the group.

30. The data processing device of claim 22, wherein said group detection utility further comprises program code for:

providing a focused set of entities for evaluating shared traits of an identified group of interest, including physical location, activities, and interests provided as attributes linked to respective nodes; and analyzing changes in a group structure over time and outputting said changes for evaluation.

31. The data processing device of claim 21, wherein said group detection utility further comprises program code for:

identifying individual nodes that connect two groups together;

tagging the individual node as a potential courier between the two groups;

performing intra-spective analysis of the groups and nodes, including one or more of the following: (a) identifying and observing collaborations; (b) detecting and facilitating ad-hoc teams; and (c) identifying and integrating potentially isolated schools of thought; and performing extra-spective analysis of the groups and nodes, including one or more of the following: (a) identifying and tracking overt groups; (b) detecting and identifying covert groups; and (c) seeding further SNA (social network analysis) functions to categorize a group's activities.

* * * * *